May 9, 1933.  J. C. BOGLE  1,908,495
ELECTRICAL SWITCH AND CONTROL CIRCUIT THEREFOR
Original Filed Nov. 19, 1927
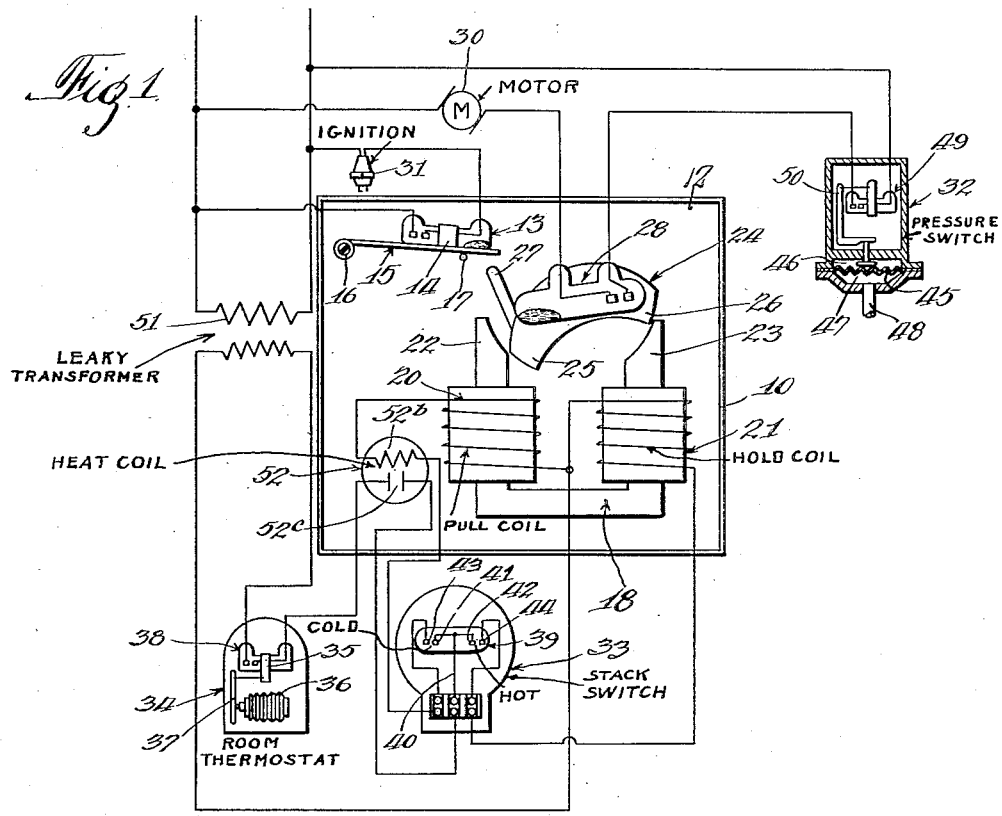
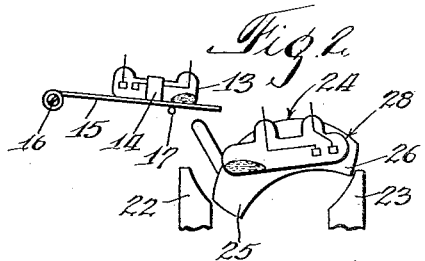
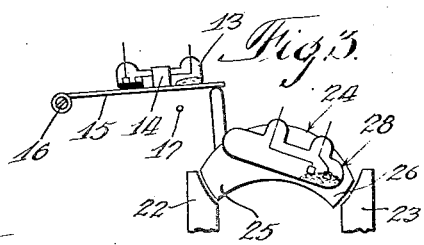
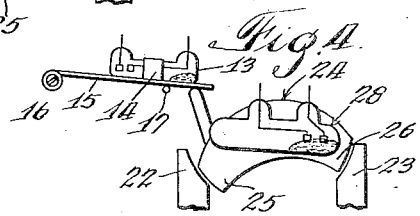
Inventor
John C. Bogle Patented May 9, 1933

1,908,495

UNITED STATES PATENT OFFICE

JOHN C. BOGLE, OF RIVER FOREST, ILLINOIS, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

ELECTRICAL SWITCH AND CONTROL CIRCUIT THEREFOR

Original application filed November 19, 1927, Serial No. 234,340. Divided and this application filed January 10, 1929, Serial No. 331,554. Renewed May 11, 1932.

This application is a division of application Serial No. 234,340, filed Nov. 19, 1927, for electrical switches, by the applicant of this application.

This invention relates to an electrical control circuit and has special reference to an electrical low voltage control and safety circuit for heating systems.

More particularly, this invention relates to an electrical switch in a safety control circuit as used for controlling the operation of force feed heating systems and the like, as for example, for the purpose of heating the boiler or furnace, a burner is employed which is supplied with fuel through a conduit to be opened and closed at will through automatic means such as a pump operated by an electrical motor or valve operated by electromagnets or otherwise.

With reference to an automatic heating system of the force feed type, the controls therefor may comprise a room thermostatic switch for directing the generation of heat in a room or other enclosure in order to guard against excessive variations in the temperature therein; a thermostatic switch for directing the specific limits of pressure or temperature to be obtained by the boiler or furnace; and other controls which, in the event of failure of the controls previously recited to promote or sustain desirable conditions of combustion within the furnace or boiler when actuated upon by these aforementioned controls, terminate the operation of the system. These latter controls will hereinafter be referred to as safety controls.

The present invention includes an assembly of all of the aforementioned controls in a low voltage circuit for use in heating systems, and particularly those systems wherein the burners employ split phase motors for forcing the fuel to the burner, these motors having a relatively slow period of starting, that is, a long interval after the motor has been energized before the starting switch has opened due to the attainment of the necessary speed. It will be noted that this control circuit is particularly applicable to force feed oil burners, the advantage being that such a control, as will hereinafter be described, is more or less independent of current consumption in the motor.

One of the electrical switches as employed in this invention, comprises a pull coil and a hold coil for operating a pair of tiltable switches, one of said switches being adapted to control the fuel supply to the burner and the other being adapted to control the ignition for the fuel supply. The pull coil and hold coil are not of the same value, the pull coil being of sufficient power to operate both of the tiltable switches to change their circuit connections, whereas the hold coil is unable to overcome the weights of the mechanisms of both of the switch members and one of the switches is permitted to operate back into its original position and original circuit connection, while the other retains its changed circuit connection. These coils are operated and controlled by a low voltage circuit obtained through a constant current transformer, or commonly known as a "leaky" transformer, whereby an electrical supply is obtained of nearly invariable voltage.

For a more complete understanding of the characteristic features of this invention, reference may now be had to the description and drawing forming a part of this specification, in which drawing:

Fig. 1 is a schematic view of the electrical control circuit, and the electrical switches and devices disposed therein.

Fig. 2 is a fragmentary view showing one of the changed positions of one of the switching mechanisms.

Fig. 3 is a view similar to Fig. 2, showing a changed position of the switching mechanism; and Fig. 4 is a view similar to Fig. 2, showing a further changed position of the switching mechanism.

Referring now to the drawing and more particularly to Fig. 1 thereof, one of the electrical switches comprises a casing 10 for enclosing the operating mechanism. A tiltable mercury contactor switch 13 is mounted in a clip 14 which latter is in turn fixedly mounted on an arm 15. One end of the arm 15 is pivotally secured as by means of the screw 16 to the mounting plate 12, the free end of the arm 15 resting on a stop 17. The arm 15 is slightly inclined to the right in its normal resting position in order to cause the mercury to remain on the right-hand side in the contactor tube.

The contactor 13 is of the usual type comprising a hermetically sealed glass container having a pair of spaced cooperating electrodes disposed at the left-hand end thereof, the mercury in the contactor being adapted to bridge the electrodes when the contactor is tilted to one of its positions. This contactor will hereinafter be referred to as the ignition switch as the electrodes therein are connected to the ignition means in the control system as will hereinafter be more fully described.

An electromagnet 18 substantially of the horseshoe type is fixedly secured to the mounting plate 12 by suitable means. The electromagnet comprises a substantially U-shaped core member preferably formed of iron laminations. A pair of coils 20 and 21 are disposed on the vertically extending arms 22 and 23, respectively, of the U-shaped core member, the upper ends of these arms being curved and having a common radius. The coil 20 will hereinafter be referred to as a "pull coil" and the coil 21 will hereinafter be referred to as a "hold coil" because of their general characteristics which will hereinafter be more fully described.

An armature 24, which may preferably be made of iron laminations although it may be cast in a single piece, is disposed above the ends of the vertically extending arms 22 and 23 and centrally thereof, the armature being pivotally mounted on the mounting plate 12 and the center therefor coinciding with the center of the radii of the curved upper end portions of the vertically extending arms 22 and 23.

The normal inoperative position of the armature 24 is shown in Fig. 1 of the drawing, one end 25 thereof being below its coacting member 22 and the other end 26 being above its coacting member 23. A projecting member 27 is secured to the armature 24 adjacent the end 25 thereof for coacting with the arm 15 of the ignition switch. It will be noted that the top of the projecting member 27 in Fig. 1 is a substantial distance below the arm 15.

A mercury contactor tube 28 is disposed on the armature 24 and is of the usual type comprising a hermetically sealed glass container having a pair of spaced cooperating electrodes at the right-hand end thereof and a body of current conducting fluid, such as mercury, for making-and-breaking the electrical circuit therethrough. The normal inoperative position of this switch, as shown in Fig. 1 of the drawing, permits the mercury in the contactor tube to remain at the left-hand end thereof out of engagement with the electrodes.

In the operation of the electrical switch just described, when the pull coil 20 is energized, sufficient power is obtained for the electromagnet to rotate the armature 24 to a position such that the lines of force thread through the end 22 of the electromagnet into the end 25 of the armature 24 to complete the magnetic field through the core 18 and the armature 24. In this operation, the projecting member 27 abuts the arm 15 to raise the ignition switch and make an electrical circuit through the contactor 13. This position is shown in Fig. 3 of the drawing, wherein both the contactor 13 and the contactor 28 are in a closed circuit position.

When the pull coil 20 is deenergized and the hold coil 21 is energized, the latter is unable to overcome the combined weights of the armature 24 and the ignition switch, whereby the latter are both permitted to drop back toward the position from which they had been moved by the pull coil until the arm 15 rests on the stop member 17. Having been relieved of the weight of the ignition switch, the hold coil has sufficient power to hold the armature 24 in a position such as is shown in Fig. 4 of the drawing, wherein the ignition switch 13 is open and the contactor 28 remains in a closed circuit position.

When the hold coil 21 is deenergized, the armature 24 is permitted to drop by its own weight to a position such as is shown in Fig. 2, or its normal inoperative position. After the hold coil 21 has been deenergized, it will be found incapable of attracting the armature 24 to close the circuit through the contactor 28, which is the main or motor switch, upon having a supply of energy restored thereto.

It is to be particularly noted in the above described construction that a definite midway position has been established between the limits of movement of the main switch 28 by means of the stop member 17 which latter not only limits the downward movement of the arm 15 and the contactor mounted thereon, but also limits the upward movement of the armature 24. This construction, therefore, obviates the necessity of determining an actual apportionment of the pull of the magnetic flux to poise the main switch in space at exactly the right angle to operate the tiltable switches.

A heat coil 52, mounted on the mounting plate 12, is of the self-soldering type of the general character shown in United States Patents, No. 817,160 of 1906 to Cook and No. 997,838 of 1911 to Leeper. The heat coil 52 is a time limit cut out having an electrical heating element 52b, which, after a predetermined time, allows automatic separation of contact members 52c. This feature is more particularly illustrated in my co-pending application of which the present application is a division.

A safety control circuit for a system such as a force feed heating system is shown in Fig. 1, having a motor 30 for feeding the fuel to the burners and an ignition means 31 for igniting the fuel thus delivered. The electrical devices represented in this control circuit comprise a pressure switch 32 for installation on a steam or vapor boiler, a stack switch 33 for installation in the stack of a boiler or furnace, and a room thermostat 34 for installation in a room or other enclosure to obtain a constant temperature therein. These electrical devices will now be specifically described, whereafter their operation in the control circuit will be recited.

The thermostatically operated room switch 34 comprises a mounting base to which is secured a bracket 35 having a thermostatic element 36 mounted thereon of the expansible and contractible bellows type. One end of the bellows 36 contacts with an actuating arm 37 pivoted at its lower end, the upper or free end thereof being secured to a tiltably mounted mercury tube contactor 38 of the usual type having a pair of spaced cooperating electrodes at one end thereof and a body of mercury therein for making-and-breaking an electrical circuit therethrough. The bellows 36 are filled with a highly volatile fluid which renders the bellows sensitive to the slightest temperature change. Upon an expansion and contraction of the bellows 36, the actuating arm 37 is moved and causes the switch 38 to which it is connected to tilt and to open or close the electrical circuit therethrough.

The thermostatically operated stack switch 33 forms a part of the safety control of the system and comprises a casing having a tiltable mercury contactor tube 39 disposed therein and mounted on a rod extending through the casing. The rod is actuated by means of a helical bimetallic element, or any other suitable thermostatic means whereby a rotation of the rod may be obtained. The switch 33 is mounted on the stack of the heating unit and is actuated by the heat of combustion therefrom. The operation of this device is more clearly illustrated and described in a copending application, filed December 17, 1925, bearing serial No. 75,895, to which reference may be had for a more detailed description of the operation thereof.

The contactor 39 comprises a hermetically sealed glass container having two pair of spaced cooperating electrodes disposed therein and a body of current conducting fluid such as mercury. One pair of cooperating electrodes is disposed adjacent each end of the container, the inner electrodes of each pair being connected together. This switch is of the type commonly called a single pole double-throw switch having a common terminal 40 connected to the inner electrodes of each pair of coacting electrodes 41 and 42. The remaining electrodes will be designated as 43 and 44.

The contactor 39 is shown in a position such that the electrode 41 is connected to the electrode 43 by means of the current conducting fluid contained in the contactor. By assuming that a combustion has taken place in the burner or boiler, the bimetallic element or thermostatic means mounted in the stack actuates the rod to tilt the contactor 39 to a position wherein an electrical circuit is completed through each pair of coacting contacts by means of the mercury extending across substantially the entire length of the tube, the tube occupying a substantially horizontal position. A further rotation of the actuating rod to tilt the contactor 39 will obtain a position wherein the mercury is caused to bridge the electrodes 42 and 44 to complete an electrical circuit therethrough. This construction will hereinafter be referred to as an overlapping switch for reasons which, as has been described, are apparent.

The pressure operated boiler switch 32 comprises a casing mounted on a diaphragm chamber. A diaphragm 45 is extended between the flanged portions to form an upper and lower chamber 46 and 47, the lower chamber 47 forming a pressure chamber into which pressure is admitted through the conduit 48. A mercury tube contactor 49 is pivotally mounted within the casing and comprises the usual sealed container having spaced cooperating electrodes disposed therein and a body of current conducting fluid in order to make-and-break an electrical circuit therethrough. The contactor 49 is tilted by means of a vertically disposed member 50 having a link extending to be secured to an arm extending from a pivotal mounting of the contactor. The actuator has a substantially horizontally extending portion for engagement with an upright member actuated by the diaphragm 45. It will be apparent that any change in pressure in the pressure chamber will be recorded on the diaphragm 45 to raise or lower the vertically extending member in engagement with the actuator 50 to tilt the contactor 49 in a direction to make-or-break an electrical circuit therethrough.

The pull and hold coils 20 and 21, respectively, are energized by the overlapping stack switch 33 and are fed with energy from the secondary of a constant current or leaky transformer 51, the primary of which is constantly across the 110 volt line. The low voltage obtained from the leaky transformer is used to operate the pull and hold coils through the low voltage stack switch 33 and the low voltage room thermostatic switch 34. The leaky transformer 51 is well known in the art and comprises a transformer, the core of which is completely magnetically saturated at the lowest voltage which could be applied to the primary of the transformer, and the additional flux due to increase of primary voltage over the saturated point is shunted around a leakage path.

In combination with the electrical devices just described in the lower voltage circuit, resistance element of the low voltage heat coil 52 is connected in series with the pull coil winding and the contact members 52c thereof are arranged to break the common wire 40 of the overlapping stack switch leading to both pull coil and hold coil. The motor 30, the main switch 28 and the pressure operated boiler switch 32 are connected in series in the high voltage line as is the ignition switch 13 and the ignition means 31. Assuming that the temperature in the room has dropped, the pressure in the boiler is low and therefore the contactor 49 is in a closed circuit position. Also the conductor 38 of the room thermostatic switch is in a closed circuit position and the contactor 39 of the stack switch is in a cold position with the mercury to the left of the tube completing an electrical circuit through the electrodes 41 and 43, there being no combustion in the boiler or furnace. The ignition switch 13 is in its normal open circuited position with the mercury to the right in the tube. An electrical circuit now exists from one side of the secondary of the leaky transformer 51 through the contactor 38, the contact members 52c through the cold position of the contactor 39, resistance element 52b of the heat coil 52, the pull coil 20 and back to the other side of the secondary. The pull coil 20 being energized, attracts the armature 24 to a second position such as is shown in Fig. 3, wherein an electrical circuit is obtained through both the contactors 13 and 28. An electrical circuit now exists from one side of the high voltage line through the motor contactor 28, the contactor 49 of the pressure operated boiler switch 32 back to the other side of the line to operate the fuel supply. At the same time, an electrical circuit is obtained from one side of the high voltage line through the ignition switch 13 and the ignition means 31 to the other side of the line to ignite the fuel fed to the burners by means of the motor 30.

If a proper combustion is obtained in the boiler, the contactor 39 will eventually move to a hot position with the mercury to the right in the tube, whereby an electrical circuit will exist from one side of the secondary of the transformer 51 through the contactor 38, the contact members 52c of the heat coil 52, the common terminal 40, electrodes 42 and 44 through the hold coil 21 and back to the other side of the secondary of the transformer. As hereinbefore stated, insufficient power is obtained through the hold coil 21 to hold the armature 24 and the ignition switch 13 in their raised positions as shown in Fig. 3 and the ignition switch 13 is permitted to drop to a position such as is shown in Fig. 4, wherein the mercury flows away from the electrodes of the ignition switch and breaks the electrical circuit through the ignition means 31. However, the contactor 28 is permitted to rest in a position such that the mercury remains bridged across the electrodes therein in order to continue the operation of the motor 30.

Inasmuch as the hold coil 21 is not of sufficient strength to raise the armature 24 to the position as shown in Fig. 4, it is necessary that the hold coil be energized before the pull coil 20 is deenergized and this action is obtained by the overlapping stack switch 39.

When a predetermined temperature has been obtained in the room, the bellows 36 of the room thermostatic control 34 will actuate the arm 37 to tilt the contactor 38 to a position such that the elecrical circuit is broken therethrough. This action, of course, breaks the electrical circuit through the hold coil 21 and deenergizes the same to permit the armature 24 to drop to its normal inoperative position such as is illustrated in Fig. 1 and Fig. 2 of the drawing. The electrical circuit through the contactor 28 is thus broken, thereby discontinuing the operation of the motor 30 and terminating the fuel supply to the burner. As there is no combustion in the furnace thereafter, the contactor 39 of the stack switch 33 will tilt to cold position with the mercury to the left as the thermostatic element contracts to rotate the tube upon which the contactor 39 is mounted.

However, should proper combustion not obtain in the boiler when the ignition circuit is closed because of the lack of oil, failure of the motor to start or through interfering conditions, the contactor 39 of the stack switch 33 remains in a cold position as the thermostatic element will not be heated to actuate the rod upon which the contactor 39 is mounted. As a consequence thereof, the current supplied to the pull coil 20 will continue to flow through the resistance elements 52b of the heat coil 52 for an undue length of time and thus cause the resistance element to open the contact members 52c of heat coil 52, thereby deenergizing the pull coil which terminates the operation of the motor 30 and the ignition means 31.

By reason of the varying conditions of voltage to which an oil burner safety apparatus is subjected, low voltage control of such heating systems has not been successful heretofore to any great degree so far as this applicant is aware, and a satisfactory time tolerance of the safety thermal release has not been heretofore successfully obtained. However, the present invention provides for a means for minimizing the variations of voltage obtaining in the protective devices and consequent variations of heat in the resistor of the low voltage circuit of the safety thermal release by means of the "leaky" transformer. Further, a well defined intermediate point in the positioning of the armature for operating the high voltage motor and ignition switches has been obtained in the low voltage circuit, the armature being actuated by a pair of low voltage magnetic coils controlled by means of a thermally operated overlapping stack switch.

While but a single embodiment of this invention is herein shown and described, it is obvious that various modifications thereof may occur to those skilled in the art without departing from the spirit and scope of this invention, and therefore, it is desired that the same be limited only by the scope of the appended claims and the prior art.

I claim:

1. An electrical control circuit for a heating system comprising a main switch for controlling the fuel supply thereof, a switch for controlling the ignition means for said fuel supply, said main switch and said ignition switch being connected in a circuit of a comparatively high voltage, a constant current transformer, an actuator connected in circuit with the secondary of said transformer for automatically actuating said ignition and main switches, thermal responsive means in said low voltage circuit for controlling said actuator, and a time limit cut-out connected in said low voltage circuit responsive to the current flow in said secondary circuit for terminating the operation of said actuator for the switches for said fuel supply means and said ignition means.

2. An electrical control circuit for a heating system comprising a main switch for controlling the fuel supply thereof, a switch for controlling the ignition means for said fuel supply, said main switch and said ignition switch being connected in a circuit of a comparatively high voltage, a constant current transformer, magnetic means connected to the secondary of said transformer for actuating said ignition and main switches, a single pole double-throw switch in said low voltage circuit responsive to the combustion of said fuel supply for controlling the energization of said magnetic means, and a time limit cut-out connected in circuit with said magnetic means and responsive to the current flow in said secondary circuit for breaking the circuit through said single pole double-throw switch to terminate the operation of said fuel supply means.

3. An electrical control circuit for a heating system comprising a main switch for controlling the fuel supply thereof, a switch for controlling the ignition means for said fuel supply, said main switch and said ignition switch being connected in a circuit of a comparatively high voltage, a constant current transformer, electro-magnetic means comprising a plurality of coils connected to the secondary of said transformer for actuating said ignition and said main switches, a switch responsive to variations of temperature in a room or other enclosure and connected in said low voltage circuit for the normal control thereof, a single pole double-throw switch in said low voltage circuit responsive to the combustion of said fuel supply for controlling the energization of said electro-magnetic means, and a time limit cut-out connected in series with said coils and responsive to the current flowing in said secondary circuit for terminating automatically the energization of said electro-magnetic means for the switches of said fuel supply means and said ignition means.

4. An electrical control circuit for a heating system comprising a main switch for controlling the fuel supply thereof, a switch for controlling the ignition means for said fuel supply, said main switch and said ignition switch being connected in a circuit of a comparatively high voltage, a constant current transformer, an actuator connected in circuit with the secondary of said transformer for automatically actuating said ignition and main swtches, thermal responsive means in said low voltage circuit for controlling said actuator, and a time limit cut-out connected in said low voltage circuit responsive to the current flowing in said secondary circuit for terminating the operation of said actuator for the switches for said fuel supply means and said ignition means.

5. An electrical control circuit for heating system comprising a main switch for controlling the fuel supply thereof, a switch for controlling the ignition means for said fuel supply, said main switch and said ignition switch being connected in a circuit of a comparatively high voltage, a constant current transformer, electro-magnetic means connected to the secondary of said transformer for actuating said ignition and main switches to close an electrical circuit therethrough, a second electro-magnetic means for actuating said ignition switch into an open circuit position while retaining said main switch in a closed circuit position, thermal responsive means in said low voltage circuit for controlling the actuation of both of said magnetic means, and a time limit cut-out connected in said low voltage circuit responsive to the current flow in said secondary circuit for terminating the energization of said electro-magnetic means for the switches of fuel supply means and said ignition means.

6. An electrical control circuit for an oil burner system comprising a main switch for controlling the fuel supply means, a relatively high voltage circuit to be connected to said fuel supply means through said main switch, a constant current transformer the primary winding of which is connected to said high voltage circuit, an actuator connected in circuit with the secondary winding of said transformer for automatically actuating said main switch, means responsive to combustion conditions of the oil burner for controlling the operation of said actuator, and a time limit cut-out connected in circuit with said secondary winding and responsive to the current flow in said secondary circuit for terminating the operation of said actuator thereby automatically opening said main switch.

7. An electrical control circuit for an oil burner system comprising a main switch for controlling the fuel supply means, a relatively high voltage circuit to be connected to said fuel supply means through said main switch, a constant current transformer the primary winding of which is connected to said high voltage circuit, an actuator connected in circuit with the secondary winding of said transformer for automatically actuating said main switch, means connected in the circuit of said secondary winding that is responsive to combustion conditions in the oil burner for controlling said actuator, and a thermally actuated time limit cut-out connected in circuit with said secondary winding which terminates the energization of said actuator to open automatically said main switch after a predetermined time interval of current flow in said secondary circuit which is occasioned when combustion of said oil burner fails.

8. An electrical control circuit for a heating system comprising a switch for controlling the fuel supply thereof, said switch being connected in a circuit of a comparatively high voltage, a constant current transformer, an actuator connected in circuit with the secondary of said transformer for automatically actuating said switch, thermal responsive means in said low voltage circuit for controlling said actuator, and a time limit cut-out connected in said low voltage circuit responsive to the current flow in said secondary circuit for terminating the operation of said actuator.

In witness whereof, I have hereunto subscribed my name.

JOHN C. BOGLE.